(12) United States Patent
Fukuda et al.

(10) Patent No.: US 8,140,547 B2
(45) Date of Patent: Mar. 20, 2012

(54) SYSTEMS, METHODS AND COMPUTER PRODUCTS FOR A MONITORING CONTEXT GENERATOR

(75) Inventors: Mari Fukuda, Yokohama (JP); Jun-Jang Jeng, Armonk, NY (US); Teruo Koyanagi, Yamato (JP); Yohsuke Ozawu, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/866,194

(22) Filed: Oct. 2, 2007

(65) Prior Publication Data

US 2009/0089276 A1   Apr. 2, 2009

(51) Int. Cl.
*G06F 17/30* (2006.01)
(52) U.S. Cl. ........ 707/754; 707/607; 707/755; 707/758; 707/802
(58) Field of Classification Search .................. 707/1, 3, 707/5, 7, 100, 102, 104.1, 763, 769, 661, 707/694, 736, 754, 783, 794, 802
See application file for complete search history.

(56) References Cited

U.S. PATENT DOCUMENTS

| | | | | |
|---|---|---|---|---|
| 6,601,058 | B2 * | 7/2003 | Forster et al. | 706/46 |
| 6,643,613 | B2 * | 11/2003 | McGee et al. | 702/186 |
| 7,334,197 | B2 * | 2/2008 | Robertson et al. | 715/853 |
| 7,386,541 | B2 * | 6/2008 | Pal et al. | 707/999.003 |
| 7,430,498 | B2 * | 9/2008 | Butterfield et al. | 703/2 |
| 7,487,176 | B2 * | 2/2009 | MacLeod et al. | 707/999.01 |
| 7,509,308 | B2 * | 3/2009 | Huang et al. | 707/999.003 |
| 7,519,577 | B2 * | 4/2009 | Brundage et al. | 707/999.003 |
| 7,580,944 | B2 * | 8/2009 | Zhuge et al. | 707/102 |
| 7,590,972 | B2 * | 9/2009 | Axelrod et al. | 717/117 |
| 7,603,374 | B2 * | 10/2009 | Cameron et al. | 707/102 |
| 7,711,670 | B2 * | 5/2010 | Roediger | 706/46 |
| 7,870,091 | B2 * | 1/2011 | Lauterbach et al. | 707/607 |
| 2006/0161559 | A1 * | 7/2006 | Bordawekar et al. | 707/100 |
| 2007/0055680 | A1 * | 3/2007 | Statchuk | 707/100 |
| 2007/0219964 | A1 * | 9/2007 | Cannon et al. | 707/3 |

OTHER PUBLICATIONS

Liangzhao Zeng, et al., "Model-Driven Business Performance Management", 2005 IEEE IEEE Computer Society, Proceedings of the 2005 IEEE International Conference on e-Business Engineering (ICEBE'05), pp. 1-10.

* cited by examiner

*Primary Examiner* — Tim T Vo
*Assistant Examiner* — Dangelino Gortayo
(74) *Attorney, Agent, or Firm* — Cantor Colburn LLP; Vazken Alexanian

(57) ABSTRACT

Systems, methods and computer products for generating calculation context classes from a relationship between structured data and a calculation procedure, the context classes having parent-child relationships. Exemplary embodiments include a method including searching the calculation procedure for a first data definition, generating a first context from a first scope applied to the first data definition, tracing back the calculation procedure to obtain a second data definition for calculating the first data definition and to which the first scope is applied, copying the calculation procedure into the first context until the second data definition is obtained, obtaining a second scope applied to the second data definition, obtaining a second context generated from the second scope, determining an existence of an order comparison of the first scope with the second scope and obtaining order from the structured data.

20 Claims, 10 Drawing Sheets

| (1) Level name | (2) Order |
|---|---|
| Grade | 3 |
| Class | 2 |
| Student | 1 |

| (1) Name | (2) Level name | (3) Event mapping rule |
|---|---|---|
| byStudent | Student | key = getStudent (InputEvent.sID) |
| byClass | Class | key = getClass (InputEvent.sID) |
| byGrade | Grade | key = getGrade (InputEvent.sID) |

Fig. 7 (700)

```
int getStudent(int sID){
  return sID;
} int getClass (int sID){
  int x = sID/100;
  int y = (sID%100)/10;
  return x*100 + y*10;
} int getGrade (int sID){
  int x=sID/100;
  return x*100;
}
```

Fig. 8 (800)

| (1) Data definition | | | |
|---|---|---|---|
| (a) name | (b) Type | (c) Scope | |
| Ave_x | Integer | byGrade | |
| X | Integer | byStudent | |
| Sigma2 | Integer | byGrade | |
| D | Integer | byStudent | |
| Ave_D | Integer | byClass | |
| InputEvent | Event | N/A | |
| ExcessD | Boolean | N/A | |

| (2) Operation | | |
|---|---|---|
| (a) Name | (b) Input Output | (c) Function |
| get_x | InputEvent / X | InputEvent.x |
| getAve_x | X / Ave_X | average(X) |
| getSigma2 | X, Ave_X / Sigma2 | average((x-Ave_x)^2) |
| getD | x, Ave_x, Sigma2 / D | ((x-Ave_x)*10/(Sigma2)^1/2) + 50 |
| getAve_D | D / Ave_D | average(D) |
| getExcessD | D / ExcessD | D > 60 |

Fig. 9 (900)

| (1) Name | (2) Event mapping rule | (3) Parent, child | (4) Variable | (5) Type | (6) Function |
|---|---|---|---|---|---|
| M0 | key=getStudent(InputEvent) | M1 M2, N/A | x<br>D<br>excessD | Integer<br>Integer<br>Boolean | x = InputEvent.x<br>D = ((x-M2.ave_x)*10/(M2.sigma2)^1/2) + 50<br>excessD = D>60 |
| M1 | key=getClass(InputEvent) | N/A, M0 | ave_D | Integer | ave_D = average(M0.D) |
| M2 | key=getGrade(InputEvent) | N/A, M0 | ave_x<br>sigma2 | Integer<br>Integer | ave_x= average(M0.x)<br>sigma2 = average((M0.x-ave_x)^2) |

SYSTEMS, METHODS AND COMPUTER PRODUCTS FOR A MONITORING CONTEXT GENERATOR

BACKGROUND OF THE INVENTION

The present disclosure relates generally to key performance indicators in the monitoring of business operation and, in particular, to systems, methods and computer products for generating calculation context classes from a relationship between structured data and a calculation procedure, the context classes having parent-child relationships.

There is an increasing need for systems that monitor business operations on computers. Examples include a system that automatically calculates KPIs (Key Performance Indicators) such as order processing time from events generated by an order receiving system and periodically sends reports and alerts to personnel in charge. In such a system, the kind of data to be monitored with the kind of calculation procedure must be defined.

If context classes are in a parent-child relationship, the relationship between the parent context and child contexts in number at run time is 1 to N and they can refer to each other's variables. The parent-child relationship between contexts enables state variables and calculation procedures to be shared between them, which can improve the efficiency of memory use during runtime and the efficiency of management of redefinitions and lifecycles of context classes. To design context classes using current techniques, it is desirable to have knowledge of KPIs, which are high-level definitions provided by professionals such as business consultants and computational expressions of the KPIs. Engineers who design context classes often do not notice state variable or calculation procedures that can be shared between contexts and define them separately in different context classes, thus resulting in duplication of descriptions, which create difficulties in modifying and managing context classes. In addition, designers often forget to define parent-child relationships. Therefore, a context class including a calculated KPI can contain a semantic error although they have assumed a reference relationship between variables of context classes when designing the context classes.

BRIEF SUMMARY OF THE INVENTION

Exemplary embodiments include, in a computer system, a method for generating calculation context classes from a relationship between structured data and a calculation procedure, the context classes having parent-child relationships, the method including searching the calculation procedure for a first data definition, generating a first context from a first scope applied to the first data definition, tracing back the calculation procedure to obtain a second data definition for calculating the first data definition and to which the first scope is applied, copying the calculation procedure into the first context until the second data definition is obtained, obtaining a second scope applied to the second data definition, obtaining a second context generated from the second scope, determining an existence of an order comparison of the first scope with the second scope and obtaining order from the structured data.

Additional exemplary embodiments include a system for generating calculation context classes from a relationship between structured data and a calculation procedure, the context classes having parent-child relationships, the system including a computer processor coupled to a memory and a process residing in the memory, the process having instructions to search the calculation procedure for a data definition N0, generate a context M0 from a scope L0 applied to the data definition N0, trace back the calculation procedure to obtain a data definition N1 for calculating the data definition N0 and to which the scope L0 is applied, copy the calculation procedure into the context M0 until the data definition N1 is obtained, obtain a scope L1 applied to the data definition N1, obtain a context M1 generated from the scope L1, determine an existence of an order comparison of the scope L0 with the scope L1 and obtain order from the structured data.

Further exemplary embodiments include a computer program product, for generating calculation context classes from a relationship between structured data and a calculation procedure, the context classes having parent-child relationships, the computer program product including instructions for causing a computer to implement a method, the method including searching the calculation procedure for a data definition N0, generating a context M0 from a scope L0 applied to the data definition N0, tracing back the calculation procedure to obtain a data definition N1 for calculating the data definition N0 and to which the scope L0 is applied, copying the calculation procedure into the context M0 until the data definition M1 is obtained, obtaining a scope L1 applied to the data definition N1, obtaining a context M1 generated from the scope L1, determining an existence of an order comparison of the scope L0 with the scope L1 and obtaining order from the structured data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 illustrates exemplary definitions of related to the exemplary levels of FIG. 5;

FIG. 8 illustrates an exemplary calculation procedure related to the exemplary levels of FIG. 5;

FIG. 9 illustrates a configuration of calculation context classes in accordance with exemplary embodiments;

The detailed description explains the preferred embodiments of the invention, together with advantages and features, by way of example with reference to the drawings.

DETAILED DESCRIPTION OF THE INVENTION

In exemplary embodiments, KPIs to be monitored and memory areas holding state variables and calculation procedures for deriving the KPIs are called calculation contexts and the definitions of the contexts are called calculation context classes. A context class is transformed into a program code executable on a computer, thereby enabling the computer to automatically monitor business operations. In exemplary embodiments, the systems and methods described herein automatically generate context classes by searching a model for KPIs and their computational expressions and a scope, which describes a level of business operations at which the KPIs are to be monitored. In exemplary embodiments, the systems and methods described herein automatically generate correct context classes containing a parent-child relationship from high-level KPIs provided by a professional such as a business consultant and the computational expressions of the KPIs.

In exemplary embodiments, the systems and methods described herein automatically generate calculation context classes including parent-child relationship from the following tree types of descriptions (models): structured data concerning business operations; scope; and calculation procedure. In exemplary embodiments, the systems and methods described herein implement an algorithm that derives a context class containing a parent-child relationship from the relationship between structured date and a calculation procedure.

Figure 1:
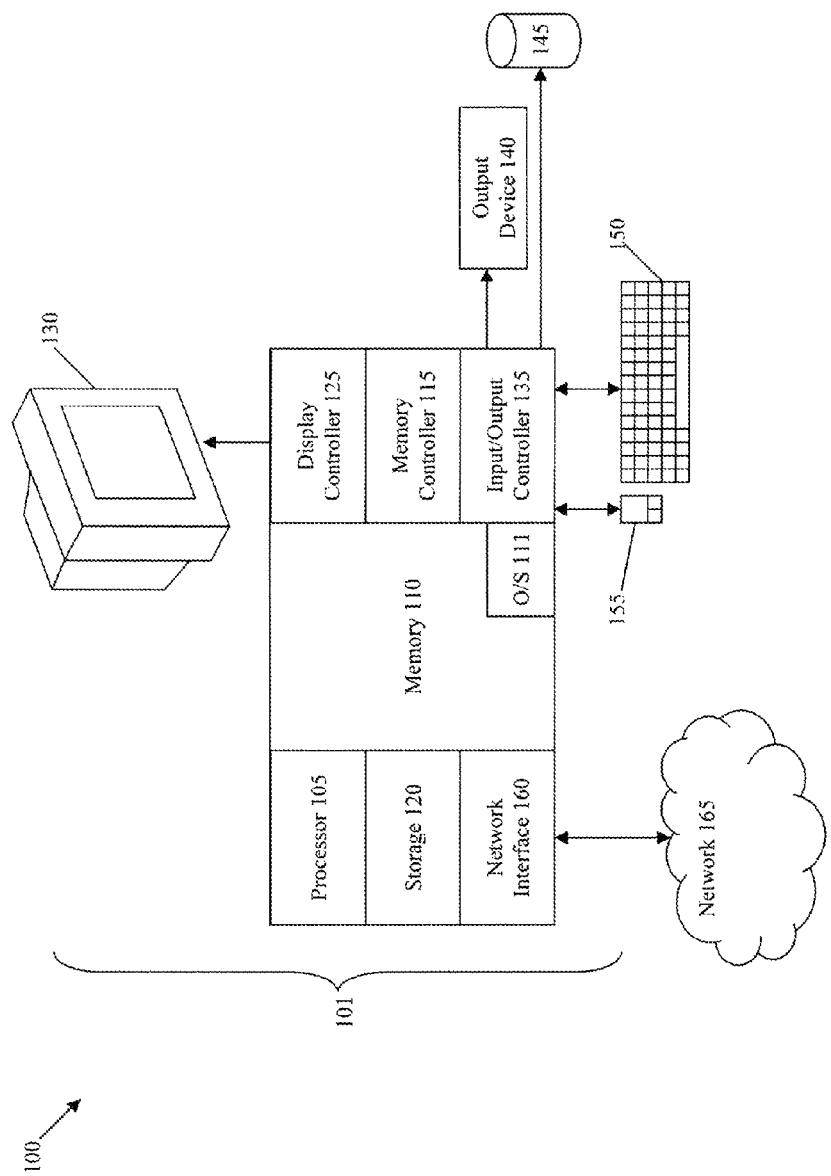
FIG. 1 illustrates an exemplary embodiment of a system for a monitoring context generator.

FIG. 1 illustrates an exemplary embodiment of a system 100 for a monitoring context generator. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 101, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a microprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which includes an ordered listing of executable instructions for implementing logical functions. In the example of FIG. 1, the software in the memory 110 includes the monitoring context generator described herein in accordance with exemplary embodiments and a suitable operating system (OS) 111. The operating system 111 essentially controls the execution of other computer programs, such as the monitoring context generator systems and methods described herein, and provides scheduling, input-output control, file and data management, memory management, and communication control and related services.

The monitoring context generator methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the monitoring context generator methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 11, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The monitoring context generator methods described herein and the OS 22, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The a monitoring context generator methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the monitoring context generator methods are implemented in hardware, the monitoring context generator methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. In exemplary embodiments, the processes can also inquire or accept a grace period input by a user of the computer 101. The grace period can be a time period after which all traffic to and from the computer ceases if no further activity has been sensed by the processes. In this way, if a user has left the computer 101 for an extended period of time or has left the computer (e.g., after a work day) the computer 101 no longer allows traffic to and from the computer 101. In art alternative implementation, the computer 101 can totally power down after the grace period has expired. In further exemplary embodiments, the processes can accept traffic only from a common network maintenance control system that provides limited services.

Figure 2:
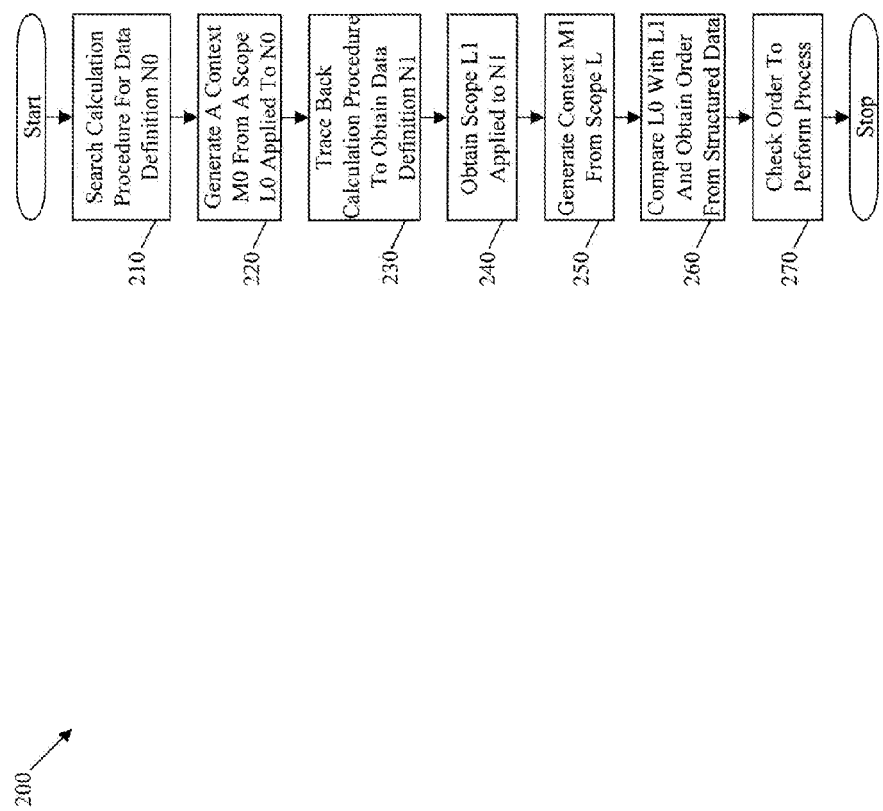
FIG. 2 illustrates a flow chart of a monitoring context generator method in accordance with exemplary embodiments.

An outline procedure of the algorithm that derives a parent-child relationship is now described. FIG. 2 illustrates a flow chart of a monitoring context generator method 200 in accordance with exemplary embodiments. At block 210 a calculation procedure is searched for a data definition N0. At block 220, a context M0 is generated from a scope L0 applied to the data definition N0 in the calculation procedure. At block 230, the calculation procedure is traced back to obtain a data definition N1 for calculating N0 and to which the scope is applied. The calculation procedure is copied into M0 until N1 is obtained. At block 240, the scope L1 applied to N1 is obtained. At block 250, a context M1 generated from scope L1 is obtained. At block 260, L0 is compared with L1 and order is obtained from structured data. At block 270, one of a plurality of processes is performed depending on the order relation determined at block 260. In exemplary embodiments, one of three processes is performed as further described herein with respect to FIG. 3.

In exemplary embodiments, the systems and method described herein enable automatic generation of context classes containing parent-child relationships from high-level descriptions of KPIs provided by a business consultant and the computational expressions of the KPIs. In exemplary embodiment, the systems and methods described herein further that automatically generate a context class from data sets make it possible to reuse already defined data to design a new combination, thereby generating additional context classes.

Figure 3:
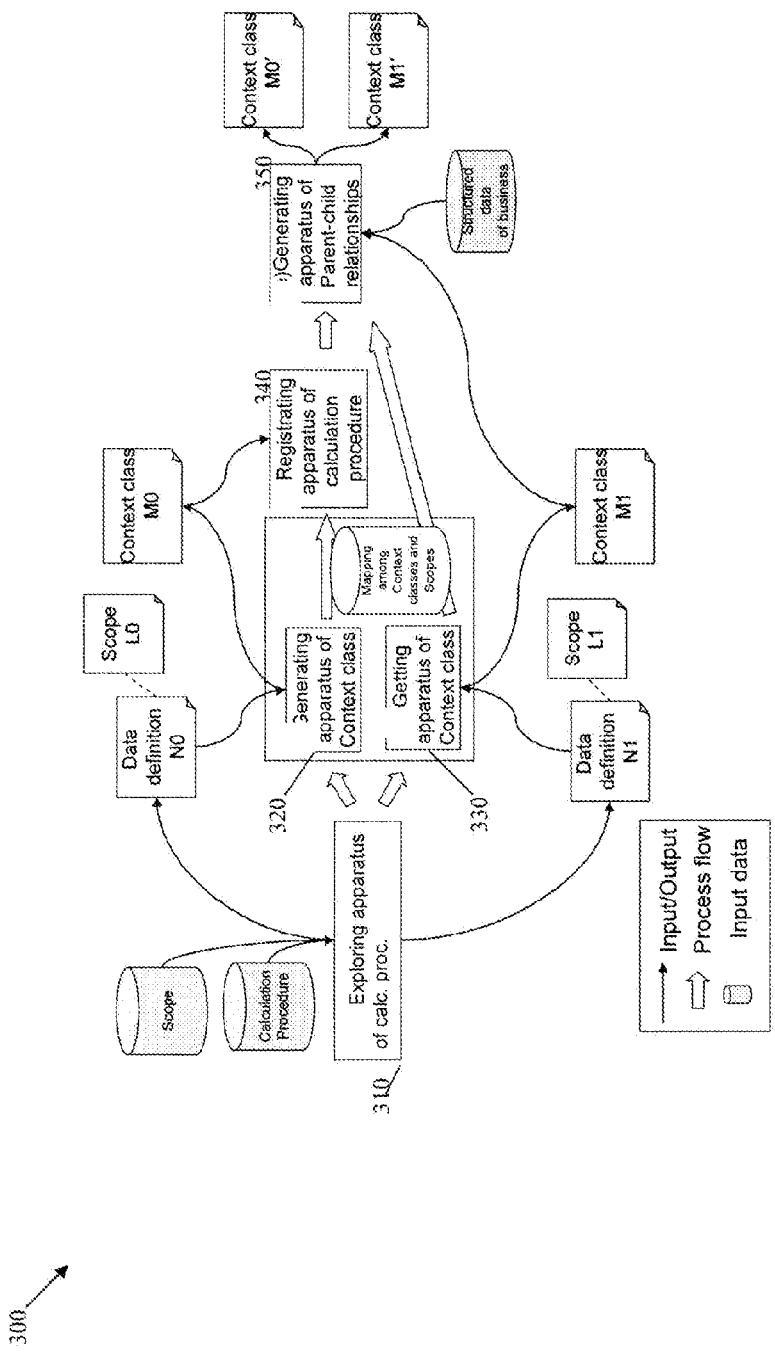
FIG. 3 illustrates a system level diagram of a monitoring content generator method indicating data flow in accordance with exemplary embodiments.

FIG. 3 illustrates a system level diagram 300 of the monitoring content generator method 200 of FIG. 2, illustrating data flow in accordance with exemplary embodiments. It is appreciated that the system level diagram can represent the software/hardware structure of the method described herein as implemented in the system 100 (see FIG. 1). The data handled and an algorithm are described further herein. In exemplary embodiments, a calculation procedure exploring apparatus 310 searches a calculation procedure to obtain data definition N0 to which a scope is applied. Then, a context class generating apparatus 320 generates a context M0 from the scope L0 applied to N0 and stores the relationship between them in a context-class/scope mapping table. A calculation procedure registering apparatus 340 traces back the calculation procedure and registers data definitions and operations for calculating N0 as local variables and functions of M0. At the same time, the calculation procedure exploring apparatus 310 obtains data definition N1 for calculating N0 and to which a scope is applied. After N1 is obtained, the calculation procedure registration process performed in calculation procedure registering apparatus 340 ends. A context class getting apparatus 330 obtains a context M1 from the context-class/scope mapping table using the scope L1 applied to N1. A parent-child relationship referring apparatus 350 obtains the order of scope L0 and L1 from structured data concerning business operations. In exemplary embodiments, one of three processes is performed depending on order relationship. When comparison between ordinal levels is possible, a context reference in which a context having a high-order scope is parent and a context having a low-order scope is child is generated in M0 and M1. The name of N0 is replaced to generate variable n0 of M0. The variable n1 of M1 generated by replacing the name of N1 is referred to from M0. When ordinal levels are the same, M0 is merged into M1, and the name of N0 is replaced to generate variable n0 of M1. When comparison between ordinal levels is impossible, the name of N0 is replaced to generate variable n0 of M0. The variables, data types, functions of M1, including variable n1 generated from N1 are copied to M0. The copied variable, n1, is referred to in M0.

Figures 4, 5, 6:
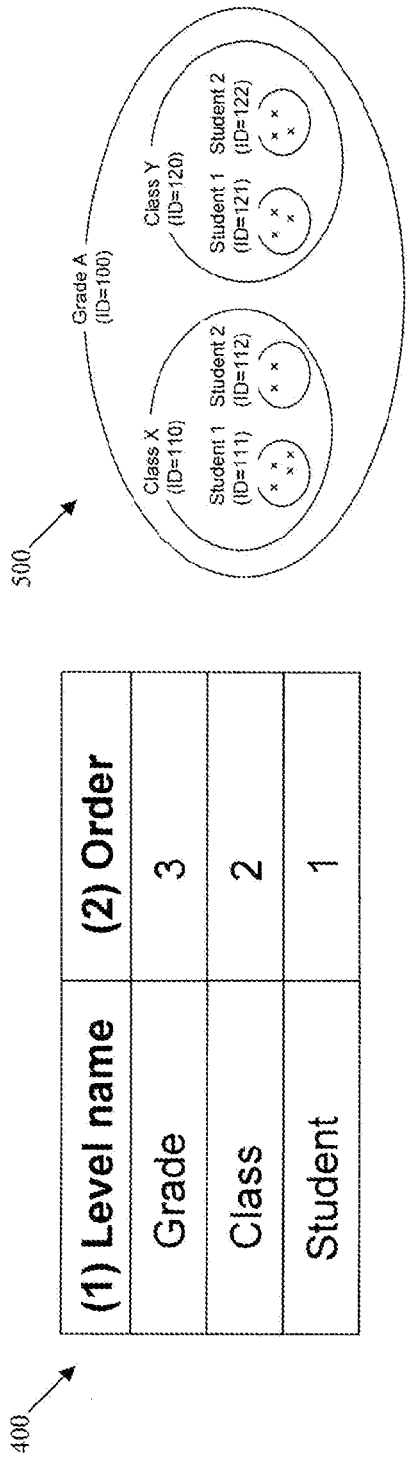
FIG. 4 illustrates an example of structured data concerning educational operations in an educational institution.
FIG. 5 illustrates exemplary levels of the structure date of FIG. 4.
FIG. 6 illustrates exemplary scopes of the structured data and levels of FIGS. 4 and 5, respectively.

FIG. 4 illustrates an example of structured data 400 concerning educational operations in an educational institution. The structured data 400 concerning operations holds (1) the level name of structures and (2) the order of levels. The order of levels is determined from the numbers of elements belonging to the levels. Exemplary levels are illustrated in FIG. 5. "Grade", "Class", and "Student" represent levels. Grade A includes Class X and Class Y. Class X includes Student 1 and Student 2. Similarly, Class Y includes Student 1 and Student 2. The marks "x" in FIG. 5 represents the minimum unit (e.g., a student) constituting an organization. The level "Grade", which includes the largest number of elements, is the highest order level; the level "Student", which includes the smallest number of elements, is the lowest. Scopes are illustrated in FIG. 6. A scope holds a name, the level name of structured data concerning operation, and an event mapping rule for deriving the identifier (key) of the scope.

An exemplary scope is bow described with respect to the example of the organisation structure shown in FIG. 5. In the example in FIG. 5, an ID is assigned to each level. In the ID code system, the hundreds place represents Grade, the tens place represents Class, and the one place represents Student. In exemplary embodiments, an event InputEvent holds an organization code (sID) as an attribute. An event mapping rule is derived from the code system of the organization structure. FIG. 7 illustrates exemplary definitions of getGrade, getClass, and getStudent. In exemplary embodiments, the definitions in FIG. 7 can be derived from the knowledge of the code system that the hundreds place represents Grade, the tens place represents Class, and the one place represents Student. Furthermore, the definition of a function can be represented by using the sum of sets of the IDs of elements, instead of using the knowledge of the code system.

An exemplary calculation procedure 800 is illustrated in FIG. 8. The calculation procedure 800 is defined by (1) data definitions and (2) operations. A data definition consists of (a) a name, (b) a data type, and (c) a list of scope names. An operation (2) includes (a) a name, (b) input/output data, and (c) a function for calculating an output. The calculation procedure, excluding the list of scope names, is equivalent to an ordinary program. In exemplary embodiments, the data definitions and operations are implemented to obtain the average of school grade deviation values of the students belonging to a class. In exemplary embodiments, the structured data concerning operations (FIG. 4), scopes (FIG. 6), and calculation procedure (FIG. 8) are used as inputs.

FIG. 9 illustrates a configuration 900 of calculation context classes in accordance with exemplary embodiments. In exemplary embodiments, the calculation context classes are the ultimate outputs to be obtained by the systems and methods described herein. A generated calculation context class includes (1) a name, (2) an event mapping rule, (3) a parent-child relationship (parent, child) between context classes, (4) a variable or variables, (5) a data type or types, and (6) a function or functions.

Figure 10:
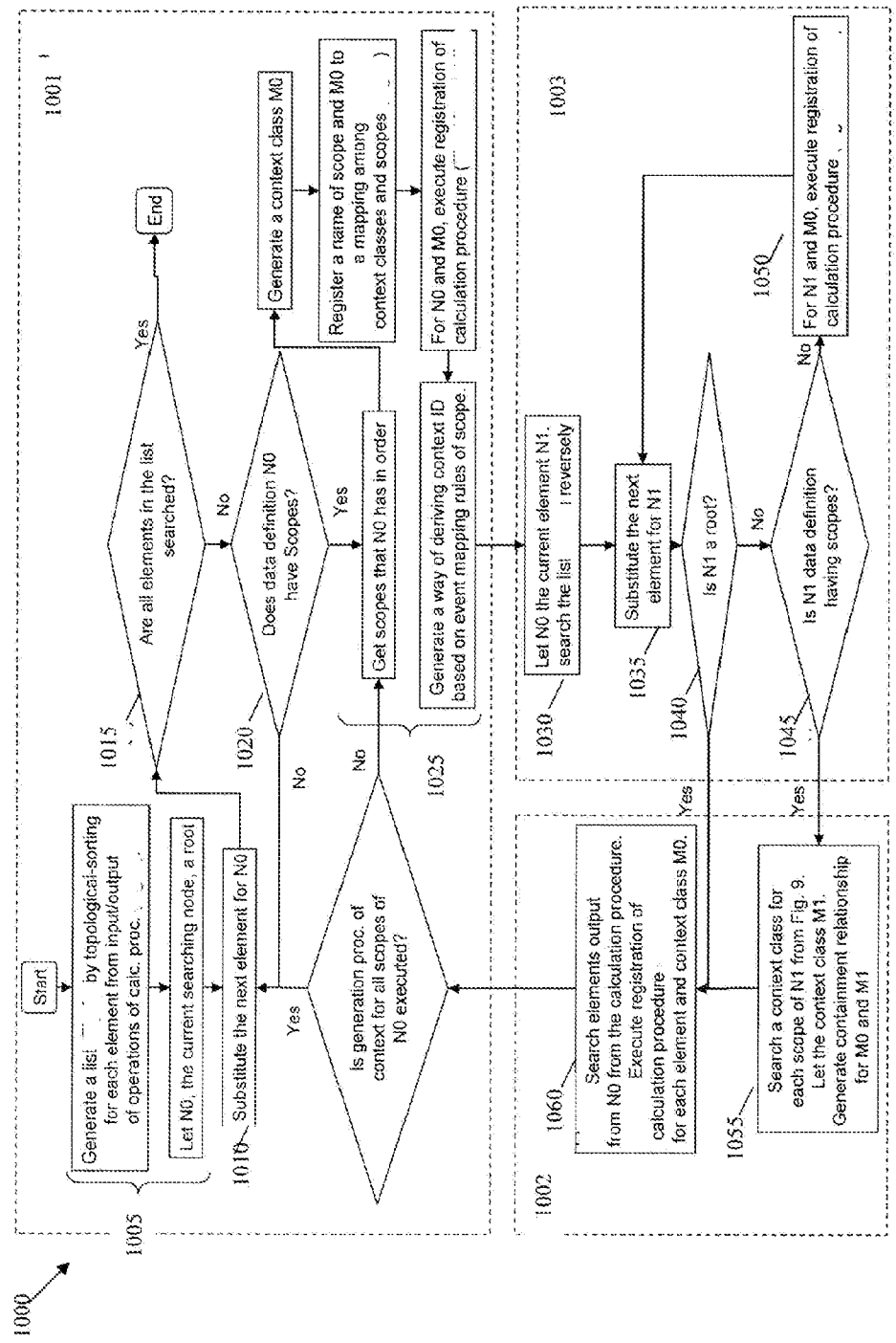
FIG. 10 illustrates a calculation context generation method in accordance with exemplary embodiments.

FIG. 10 illustrates a calculation context generation method 1000 in accordance with exemplary embodiments. In exemplary embodiments, the calculation context generation method 1000 includes overall blocks 1001, 1002, 1003, each block having respective sub-blocks.

With respect to block 1001, data definitions and operations are topologically sorted on the basis of inputs and outputs of operations (see FIG. 8) of a calculation procedure to generate a list at block 1005. The list generated at block 1005 and the search procedure for the list are illustrated as 1101 in FIG. 11. The list contains data definitions and operations, which are intermediate data for generating calculation context classes, which is the ultimate output. The sorting ensures that a calculation context class M1 has already been generated at block 1003, as further described herein. At block 1010, a search of the list is started. The element being searched for is denoted by N0. If the entire list has been searched at block 1015, the method 1000 ends. At block 1020, a determination is made as to whether N0 is a data definition that has scopes. If this condition is not met (that is, if N0 is an operation or a data definition that does not have a scope), the next element is substituted for N0 at block 1010. If the condition is met, the process proceeds to blocks 1025.

Figure 11:
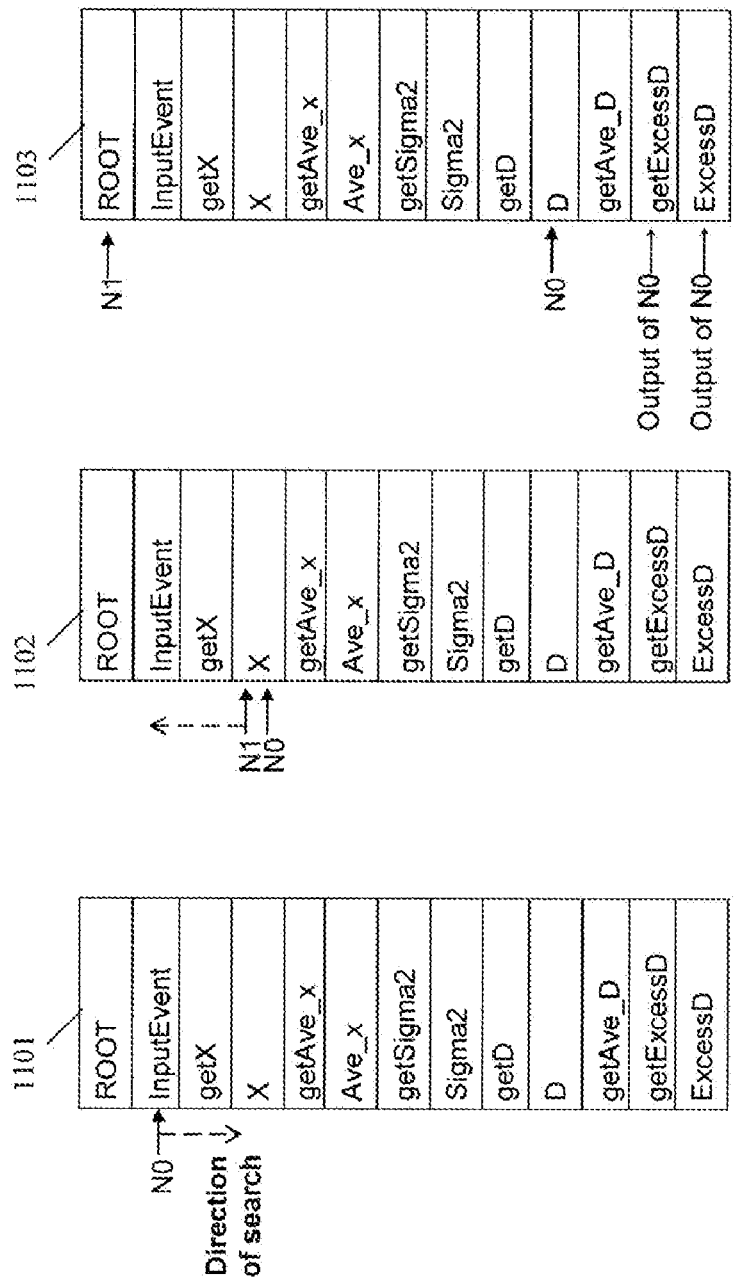
FIG. 11 illustrates exemplary lists generated by the exemplary calculation context generation method of FIG. 10.
Figures 12, 13, 14:
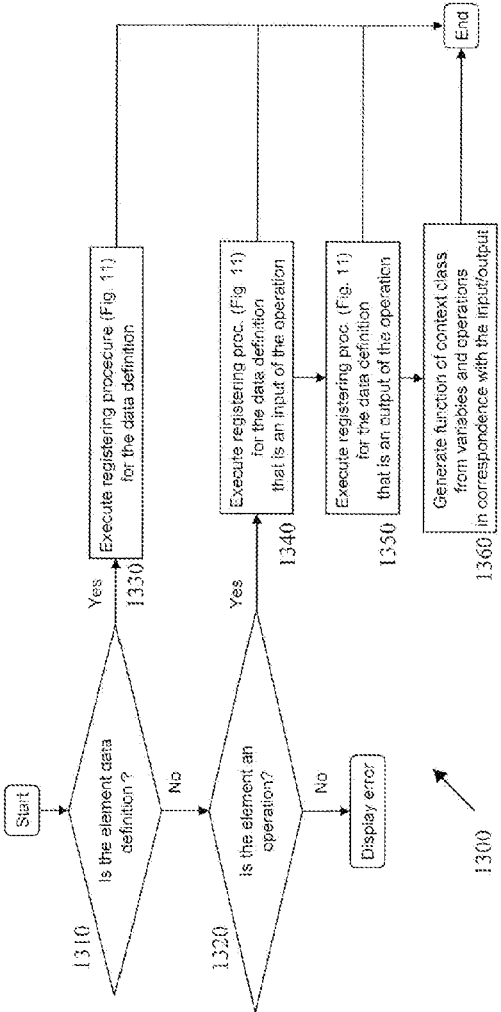
FIG. 12 illustrates a context-class/scope mapping table in accordance with exemplary embodiments.
FIG. 13 illustrates a method 1300 that generates variables, data, and functions in the calculation context in accordance with exemplary embodiments.
FIG. 14 illustrates a flow chart for an registration method in accordance with exemplary embodiments.

At blocks 1025, processing for generating a calculation context class and generating an identifier of the generated context is performed on the basis of a scope. First, a scope is obtained and a calculation context class M0 is generated. Then, the name of the context class and the name of the scope are registered in a context-class/scope mapping table. FIG. 12 illustrates a context-class/scope mapping table 1200 in accordance with exemplary embodiments. Similar to the list in FIG. 9, the context-class/scope mapping table 1200 is intermediate data for generating context classes. In exemplary embodiments, the context-class/scope table 1200 manages context classes to prevent, generation of multiple context classes for one scope. Variables and data types of M0 are then generated from N0. Lastly, a methodology for deriving a context identifier is generated on the basis of an event mapping rule of the scope. As a result of the procedure described above, part of the names of calculation context classes, event mapping rules, variables, and data types illustrated in FIG. 11 are generated. Exemplary methods for registering a calculation procedure performed at blocks 1025 are below with reference to FIGS. 13 and 14. In the calculation procedure registration process (see FIGS. 13 and 14), the calculation procedure (see FIG. 8) is replaced with variables and functions of the calculation context.

Figures 15, 16:
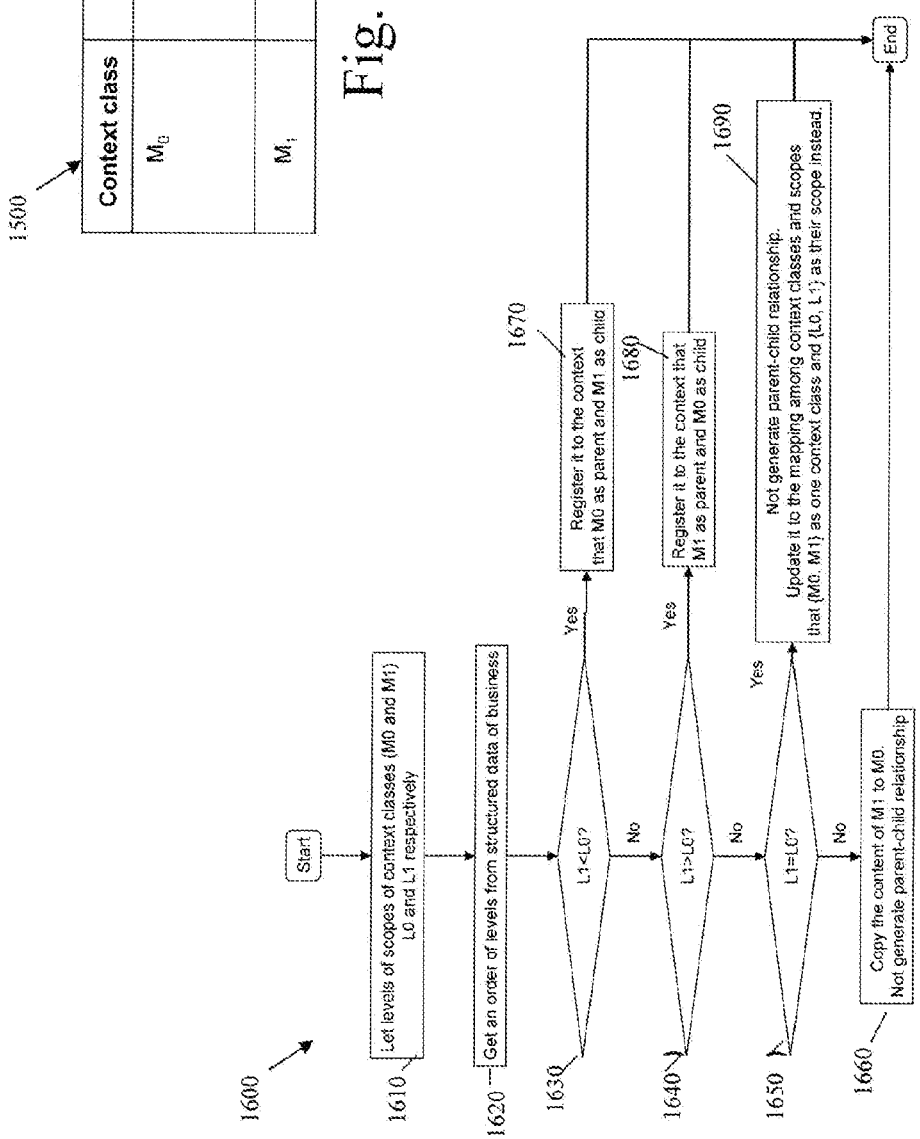
FIG. 15 illustrates a mapping table 1500 in accordance with exemplary embodiments.
FIG. 16 illustrates a flow chart of a method 1600 for generating calculation context class parent-child relationship in accordance with exemplary embodiments.

FIG. 13 illustrates a method 1300 that generates variables, data, and functions in the calculation context in accordance with exemplary embodiments. If an element of the list shown in FIG. 11 is a data definition at block 1310, the data definition is registered in the calculation context at block 1330. If an element is an operation at block 1320, a registration process (see FIG. 14) is performed for a data definition that is the input of the operation at block 1340 and a data definition that is the output of the operation at block 1350 and then a function of the calculation context class is generated from the variables and operations correspondent to input and output data at block 1360. In the registration method 1400 (see FIG. 14), at block 1410 a check is made to prevent a variable of the context class equivalent to the data definition of interest from being redundantly generated. Then, variables of the context class and their data types are generated at block 1420. The variables and data types are registered in a mapping table between data definitions and variables of context classes. FIG. 15 illustrates a mapping table 1500 in accordance with exemplary embodiments. The data-definition/variable mapping table is intermediate data for generating a calculation context class. With this table, the variable names and data definitions of the calculation context classes are managed, thereby preventing multiple variables from being generated for the same data definition.

Referring again to FIG. 10, after the completion of block 1001, the method 1000 proceeds to block 1002.

At block 1002, a new pointer N1 is generated in the list (see FIG. 11) used for context, generation and variables, data types, and functions of the context class M0 are generated. At block 1030, the pointer N1 for tracing back the list shown in FIG. 11 is generated. The state of the list at block 1030 is illustrated as 1102 FIG. 11. At block 1035, a next element is substituted for N1. At block 1040, the method 1000 determines whether N1 is a root. If N1 is not a root at block 1040, then the method 1000 determines whether the N1 data definition has scopes at block 1045. If the N1 data definition does not have scopes at block 1045, then at block 1045, for N1 and M0, a registration of calculation procedure is executed (see FIGS. 13 and 14). Blocks 1035, 1040, 1045, 1050 are repeated until M1 reaches the ROOT, determined at block 1040, while N0 is kept unchanged. If N1 is not related to the input of N0, N1 is moved to the next element at block 1035. The methods 1300, 1400 for registering the calculation procedure is performed are described with reference to FIGS. 13 and 14. When N1 reaches the ROOT, or N1 points a data definition having a scope, the method 1000 proceeds to block 1003.

At block 1003 of, parent-child relationships are generated as needed and variables, data types, and functions are registered in the calculation context. If N1 has more than one scope, blocks 1055, 1060 are performed for each of those scopes. First at block 1055, the mapping table in FIG. 12 is searched for a calculation context class associated with the scope of N1 and the calculation context is denoted by M1. Then, a parent-child relationship is generated from the scopes of M0 and M1 and structured data concerning business operations (see FIG. 4) at block 1060. In exemplary embodiments, the level of the structured data associated with the scope of M0 is denoted by L0 and the level of the structured data associated with the scope of M1 is denoted by L1. An exemplary method for generating a parent-child relationship will be described with reference to FIG. 16.

Figure 17:
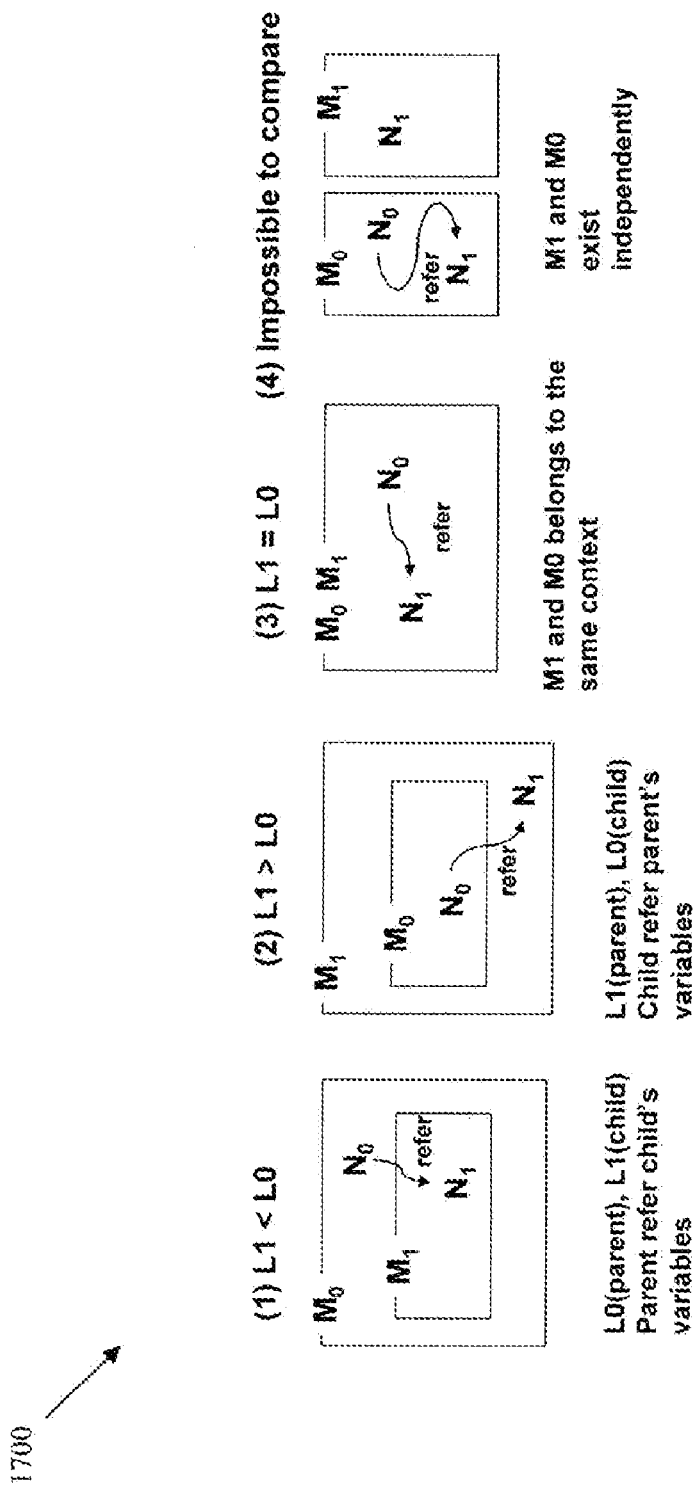
FIG. 17 illustrates a diagram of generation of parent-child relations between calculation contexts and a reference relationship between variables in accordance with exemplary embodiments.

FIG. 16 illustrates a flow chart of a method 1600 for generating calculation context class parent-child relationship in accordance with exemplary embodiments. First, at block 1610 the ordinal levels of L0 and L1 are obtained from the structured data at block 1620. At block 1630, if L1<L0, then M0 is registered as parent and M1 is registered as child in the calculation context class (see FIG. 9) at block 1670. Because N0 in FIG. 11 refers to N1, parent's variables refer to child's variables in the calculation context generated. FIG. 17 illustrates a diagram 1700 of generation of parent-child relations between calculation contexts and a reference relationship between variables in accordance with exemplary embodiments. Shown from left to right in FIG. 17 are generations of parent-child relationships of the calculation context and reference relationships between variables, which correspond to blocks 1630, 1640, 1650, 1660 of FIG. 16. Referring again to FIG. 16, at block 1640, if L1>L0, M1 is registered as parent and M0 is registered as child in the calculation context class (see FIG. 9) at block 1680. In exemplary embodiments, the parent's variables refer to the child's variables in FIG. 17. By the generation procedure, a calculation context class is generated that has a parent-child relationship that allows reference to a variable while maintaining the relation between contexts in number. At block 1650, if L1=L0, the contexts are considered to be the same and the calculation-context/scope mapping table (see FIG. 12) is updated and a reference relationship between the variables is generated at block 1690. Lastly, if comparison between L1 and L0 is impossible at block 1660, the content of M1 is copied to M0 so that M1 and M0 contexts exist independently of each other. In this case, parent-child relationship is not generated.

Referring again to FIG. 10, at block 1001, the calculation procedure is searched for elements output from N0 and a calculation procedure registration process is performed for the elements and M0. The search is illustrated as 1103 FIG. 11. With this search, the entire generation process concerning M0 ends.

In exemplary embodiments, calculation context classes in parent-child relationship with each other, which have been difficult to describe, are automatically generated from high-level descriptions of business operations. Consequently, the efficiencies of memory use mid management implemented for execution of contexts during run time can be improved. Furthermore, the systems and methods described herein automatically generate a context class from three kinds of data and make it possible to reuse already defined data to design a new combination, thereby generating another context class.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method for generating calculation context classes from a relationship between structured data and a calculation procedure, the context classes having parent-child relationships, the method comprising:
   searching the calculation procedure for at least one of a first data definition and an operation, wherein the calculation procedure is configured to derive Key Performance Indicators from a business operation, and wherein the context classes having the parent-child relationships are from the Key Performance Indicators;
   in response to identifying the operation, registering the operation for the first data definition that is an input of the operation and registering the operation for the first data definition that is an output of the operation;
   generating a first context from a first scope applied to the first data definition;
   tracing back the calculation procedure to obtain a second data definition for calculating the first data definition and to which the first scope is applied;
   copying the calculation procedure into the first context until the second data definition is obtained;
   obtaining a second scope applied to the second data definition;
   obtaining a second context generated from the second scope;
   determining an existence of an order comparison of the first scope with the second scope;
   obtaining an order from the structured data;
   in response to the second scope being less than the first scope, registering the first context as a parent and the second context as a child;
   in response to the second scope being greater than the first scope, registering the second context as a parent and the first context as a child; and
   in response to the second scope being equal to the first scope, registering both the first and second contexts as a single context class, and registering both the first and second scopes as a single scope of the single context class,
   wherein in response to an inability to compare an order of the first scope with an order of the second scope, the first and second contexts exist independently without a parent-child relationship,
   wherein the first and second scopes each describe a level of business operations at which the Key Performance Indicators are to be monitored, the first and second scopes each holding a name, a level name of structured data concerning the operation, and an event mapping rule for deriving an identifier for each of the first and second scopes.

2. The method as claimed in claim 1 further comprising:
   in response to the existence of an order comparison between the first scope and the second scope, performing:
      generating a context reference in the first context and the second context,
      replacing a name of the first data definition to generate a first variable of the first context; and
      referring to a second variable of the second context from the first context.

3. The method as claimed in claim 2 wherein a high-order scope in the context reference in the first context and the second context is a parent, and a low-order scope in the context references in the first context and the second context is a child.

4. The method as claimed in claim 2 wherein the second variable of the first context is generated by replacing a name of the second data definition.

5. The method as claimed in claim 1, further comprising:
   in response to an order of the first scope and an order of the second scope being equal, performing:
      merging the first context into the second context; and
      replacing a name of the first data definition to generate a first variable of the second context.

6. The method as claimed in claim 1 further comprising:
   in response to the inability to compare an order of the first scope with an order of the second scope, performing:
      replacing a name of the first data definition to generate a first variable of the first context;
      copying attributes of the second context to the first context; and
      referring to a copied second variable in the first context.

7. The method as claimed in claim 6 wherein the attributes of the second context include variables, data types and functions.

8. A system for generating calculation context classes from a relationship between structured data and a calculation procedure, the context classes having parent-child relationships, the system comprising:
   a computer processor coupled to a memory; and
   a process residing in the memory, the process having instructions causing the computer processor to:
      search the calculation procedure for at least one of a data definition N0 and an operation, wherein the calculation procedure is configured to derive Key Performance Indicators from a business operation, and wherein the context classes having the parent-child relationships are from the Key Performance Indicators;
      in response to identifying the operation, registering the operation for the first data definition N0 that is an input of the operation and registering the operation for the first data definition N0 that is an output of the operation;
      generate a context M0 from a scope L0 applied to the data definition N0;
      trace back the calculation procedure to obtain a data definition N1 for calculating the data definition N0 and to which the scope L0 is applied;
      copy the calculation procedure into the context M0 until the data definition N1 is obtained;
      obtain a scope L1 applied to the data definition N1;
      obtain a context M1 generated from the scope L1;
      determine an existence of an order comparison of the scope L0 with the scope L1;
      obtain an order from the structured data;
      in response to the scope L1 being less than the scope L0, register the context M0 as a parent and the context M1 as a child;

in response to the scope L1 being greater than the first the scope L0, register the second context as a parent and the context M0 as a child; and in response to the scope L1 being equal to the scope L0, register both the first and second contexts M0, M1 as a single context class, and register both the first and second scopes L0, L1 as a single scope of the single context class, wherein in response to an inability to compare an order of the first scope with an order of the second scope, the first and second contexts, M0, M1 exist independently without a parent-child relationship, wherein the scopes L0, L1 each describe a level of business operations at which the Key Performance Indicators are to be monitored, the scopes L0, L1 each holding a name, a level name of structured data concerning an operation, and an event mapping rule for deriving an identifier for each of the scopes L0, L1.

9. The system as claimed in claim 8 wherein the instructions further include instructions to:

in response to the existence of an order comparison between the scope L0 and the scope L1, performing:
generate a context reference in the context M0 and the context M1,
replace a name of the data definition N0 to generate a variable, n0, of the context M0; and
refer to a variable, n1, of the context M1 from the context M0.

10. The system as claimed in claim 9 wherein a high-order scope in the context reference in the context M0 and the context M1 is a parent, and a low-order scope in the context references in the context M0 and the context M1 is a child.

11. The system as claimed in claim 9 wherein the variable, n1, of the context M0 is generated by replacing a name of the data definition N1.

12. The system as claimed in claim 8, wherein the instructions further include instructions to:

in response to an order of the scope L0 and an order of the scope L1 being equal, performing:
merge the context M0 into the context M1; and
replace a name of the data definition N0 to generate a variable, n0, of the context M1.

13. The system as claimed in claim 8 wherein the instructions further include instructions to:

in response to the inability to compare an order of the scope L0 with an order of the scope L1, performing:
replace a name of the data definition N0 to generate a variable, n0, of the context M0;
copy attributes of the context M1 to the context M0; and
refer to a copied variable, n1, in the context M0,
wherein the attributes of the context M1 include variables, data types and functions.

14. A computer program product for generating calculation context classes from a relationship between structured data and a calculation procedure, the context classes having parent-child relationships, the computer program product including instructions for causing a computer to implement a method, the method comprising:

searching the calculation procedure for at least one of a data definition N0 and an operation, wherein the calculation procedure is configured to derive Key Performance Indicators from a business operation, and wherein the context classes having the parent-child relationships are from the Key Performance Indicators;

in response to identifying the operation, registering the operation for the first data definition N0 that is an input of the operation and registering the operation for the first data definition N0 that is an output of the operation;

generating a context M0 from a scope L0 applied to the data definition N0;

tracing back the calculation procedure to obtain a data definition N1 for calculating the data definition N0 and to which the scope L0 is applied;

copying the calculation procedure into the context M0 until the data definition N1 is obtained;

obtaining a scope L1 applied to the data definition N1;

obtaining a context M1 generated from the scope L1;

determining an existence of an order comparison of the scope L0 with the scope L1;

obtaining an order from the structured data;

in response to the scope L1 being less than the scope L0, registering the context M0 as a parent and the context M1 as a child;

in response to the scope L1 being greater than the first the scope L0, registering the second context as a parent and the context M0 as a child; and in response to the scope L1 being equal to the scope L0, registering both the first and second contexts M0, M1 as a single context class, and registering both the first and second scopes L0, L1 as a single scope of the single context class, wherein in response to an inability to compare an order of the first scope with an order of the second scope, the first and second contexts, M0, M1 exist independently without a parent-child relationship, wherein the scopes L0, L1 each describe a level of business operations at which the Key Performance Indicators are to be monitored, the scopes L0, L1 each holding a name, a level name of structured data concerning an operation, and an event mapping rule for deriving an identifier for each of the scopes L0, L1.

15. The computer program product as claimed in claim 14 wherein the method further comprises:

in response to the existence of an order comparison between the scope L0 and the scope L1, performing:
generating a context reference in the context M0 and the context M1,
replacing a name of the data definition N0 to generate a variable, n0, of the context M0; and
referring to a variable, n1, of the context M1 from the context M0.

16. The computer program product as claimed in claim 15 wherein a high-order scope in the context reference in the context M0 and the context M1 is a parent, and a low-order scope in the context references in the context M0 and the context M1 is a child.

17. The computer program product as claimed in claim 15 wherein the variable, n1, of the context M0 is generated by replacing a name of the data definition N1.

18. The computer program product as claimed in claim 14, wherein the method further comprises:

in response to an order of the scope L0 and an order of the scope L1 being equal, performing:
merging the context M0 into the context M1; and
replacing a name of the data definition N0 to generate a variable, n0, of the context M1.

19. The computer program product as claimed in claim 14 wherein the method further comprises:

in response to the inability to compare an order of the scope L0 with an order of the scope L1, performing:
replacing a name of the data definition N0 to generate a variable, n0, of the context M0;
copying attributes of the context M1 to the context M0; and
referring to a copied variable, n1, in the context M0.

20. The computer program product as claimed in claim 19 wherein the attributes of the context M1 include variables, data types and functions.

* * * * *